3 Sheets—Sheet 1.

A. W. PORTER & F. M. GRIMES.

AIR AND GAS CARBURETER.

No. 6,865. Reissued Jan. 18, 1876.

WITNESSES

E. H. Bates

George E. Upleace.

INVENTORS

Alonzo W. Porter

Francis M. Grimes,

Chipman Frost & Co.

ATTORNEYS

3 Sheets—Sheet 2.

A. W. PORTER & F. M. GRIMES.

AIR AND GAS CARBURETER.

No. 6,865. Reissued Jan. 18, 1876.

WITNESSES

Robert Everett.

George E. Upham.

INVENTOR

Alonzo W. Porter,

Francis M. Grimes,

Chipman & Freeman & Co.

ATTORNEYS.

3 Sheets—Sheet 3.

A. W. PORTER & F. M. GRIMES.

AIR AND GAS CARBURETER.

No. 6,865. Reissued Jan. 18. 1876.

WITNESSES

Robert Everett

Geo. H. Lanner

INVENTORS

Alonzo W. Porter,

Francis M. Grimes,

Chipman & Fawcett Co.,

ATTORNEYS

UNITED STATES PATENT OFFICE.

ALONZO W. PORTER AND FRANCIS M. GRIMES, OF NEW YORK, N. Y.

IMPROVEMENT IN AIR AND GAS CARBURETERS.

Specification forming part of Letters Patent No. 168,048, dated September 21, 1875; reissue No. 6,865, dated January 18, 1876; application filed December 14, 1875.

*To all whom it may concern:*

Be it known that we, ALONZO W. PORTER and FRANCIS M. GRIMES, of New York, in the county of New York and State of New York, have invented a new and valuable Improvement in Air and Gas Carbureters; and we do hereby declare that the following is a full, clear, and exact description of the construction and operation of the same, reference being had to the annexed drawings, making a part of this specification, and to the letters and figures of reference marked thereon.

Figure 1:
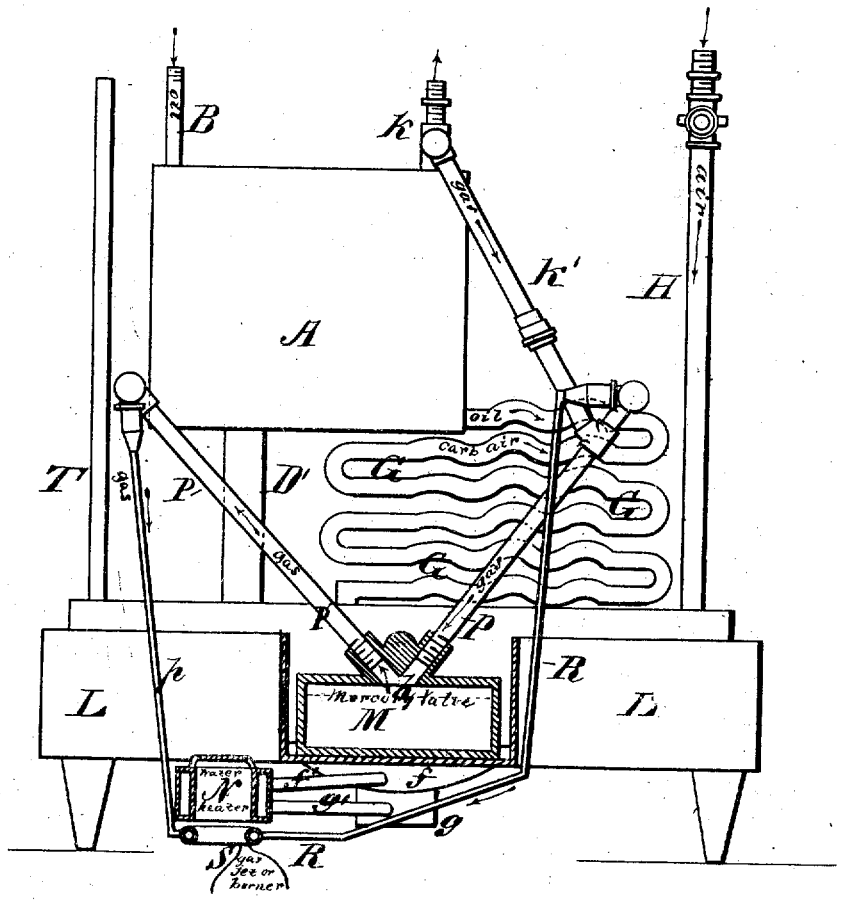
Figure 2:
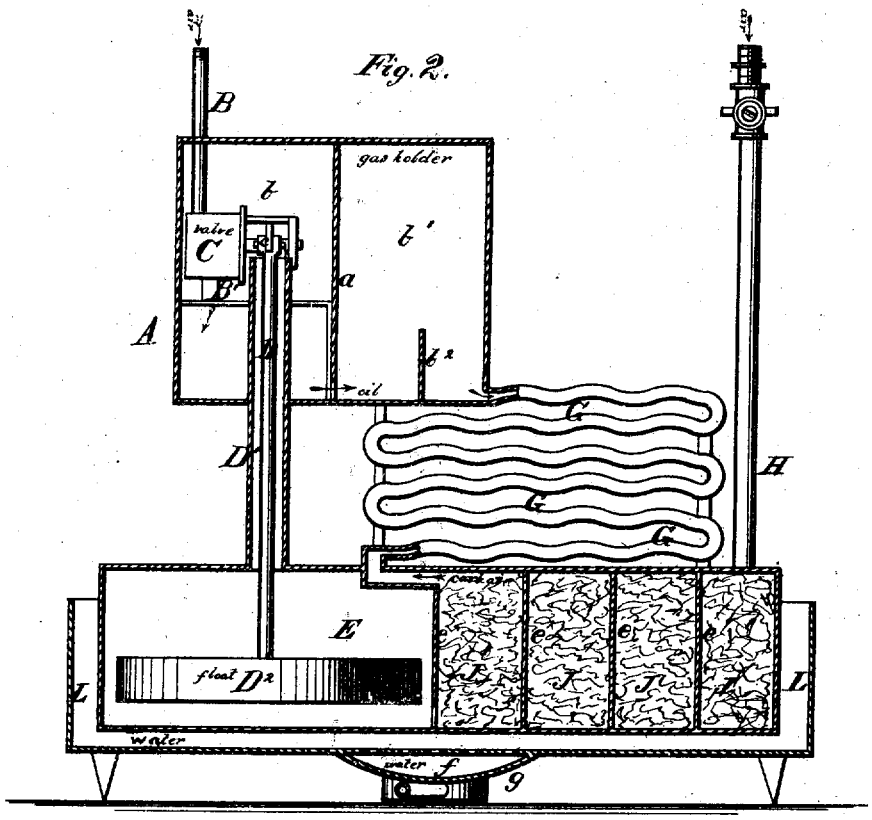
Figure 3:
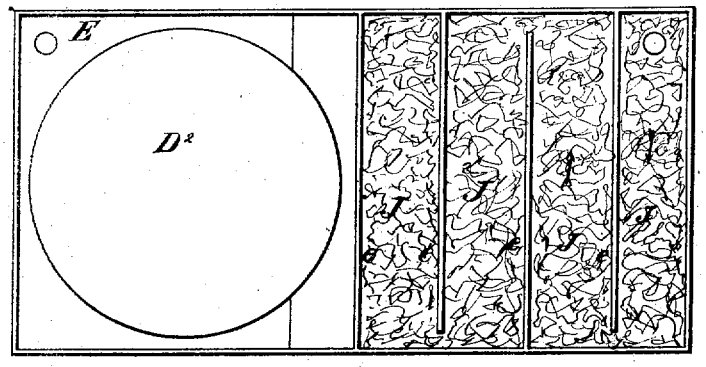

Figure 1 of the drawings is a representation of a front view, part sectional, of our carbureter. Fig. 2 is a vertical sectional view of the same, and Fig. 3 is a plan view thereof.

This invention has relation to apparatus for carbureting air or gas for illuminating purposes; and the nature of our invention consists, mainly, in combining with a subdivided feed-chamber an automatic supply-valve and a series of broad, horizontal, and hollow folds, through which gasoline or other light hydrocarbon fluid flows in one direction, and air or gas flows in an opposite direction, as will be hereinafter explained. The invention also consists in combining with the above a cell-chamber containing gasoline, in one compartment of which floats the hollow vessel which actuates the valve in the feed-chamber, as will be hereinafter explained. The invention finally consists in an automatic regulator of the heat, which we designate a hydro-thermostat, which is applied to the gasifying chamber or chambers, for the purpose of maintaining the proper vaporizing-temperature in these chambers, as will be hereinafter explained.

In the annexed drawings, A designates a rectangular box of any suitable capacity, which is divided by a partition, *a*, into two compartments, *b b'*, communicating with each other by means of openings through the bottom of the partition *a*. B is the supply-pipe for the gasoline, which pipe leads from an elevated reservoir of this fluid into the compartment *b*, terminating therein in a valve-box, C, out of which leads vertically a discharge-pipe, B'. The stem of the valve in the box C has an arm, *c*, keyed on it, the free end of which is pivoted to a rod, D, that passes freely through a pipe, $D^1$, and has a float, $D^2$, secured to its lower end. The float $D^2$ is vertically movable in the gasoline in a chamber, E. By the rise and fall of the float $D^2$ the valve in the box is actuated, and the flow of the fluid into chamber *b* is regulated or cut off. The pipe $D^1$ rises in chamber *b* several inches, or at least high enough to prevent the gasoline therein from flowing over it. In the chamber $b^1$ there is a division-plate, $b^2$, rising a few inches for allowing the gasoline to collect in the chamber *b* and to flow over into the discharging portion of the chamber $b^1$. From the chamber $b^1$ the gasoline flows in a thin broad sheet forward and backward through a number of folds of a conduit, G, which folds are corrugated, as shown in Figs. 1 and 2. The object of corrugating or waving the folds of the conduit is to obtain a very large amount of surface in a comparatively small space, and to cause the fluid to spread itself evenly over its entire surface. By this means the volatilization of the fluid is greatly accelerated. The corrugations also give an undulating motion to the flowing liquid. From the conduit G the gasoline flows into the first one of a series of chambers, J, which are separated by partitions *e*, open alternately at their ends for the purpose of causing air or gas introduced through a pipe, H, to circulate back and forth from one end to the other of every one of said chambers J over the gasoline therein. After leaving the last one of the series of chambers the air or gas circulates through the conduit G, where it takes up the vapor of hydrocarbon and becomes highly enriched. From the highest one of the folds of the conduit G the enriched gas enters chamber $b^1$, from which it is drawn off for use through a pipe, K.

The apparatus above described is arranged inside of a tank, L, which is designed for containing water, and which may extend up any desired height. In the bottom of the tank L are two sinks, *f g*, which communicate with an annular box, N, by means of pipes *f'* and *g'*. The pipe *g'* allows water to pass from the tank into the box N, and from the latter, when heated, through pipe *f'*, back into the tank, thus keeping up a circulation of the water when being heated. In an offset of the tank L we arrange a shallow vessel, M, which is nearly full of mercury, and through the top of this vessel is a hole, *h*, which communicates with two pipes, P P′, diverging from each other. The pipe P communicates with the pipe K by means of a pipe, K′, and from the upper end of pipe P a small pipe, R, is carried downward and beneath the box N, for the purpose of furnishing a small taper flame to a circular burner, S. This circular burner S is arranged directly beneath the box N, and, when lighted, will heat the water in this box and maintain a proper temperature of the mercury below the boiling-point of gasoline for the operation of the hydro-thermostat. The circular burner S is supplied with gas from a pipe, *p*, leading from the upper end of the pipe P′. When the liquid in the tank L reaches a temperature of 70° Fahrenheit the mercury in the vessel M will rise and cut off the supply of gas to the burner S, thus putting out the flame and allowing the temperature of the fluid in said tank to fall. The mercury in the vessel M will descend and open a communication again for the supply of gas to the burner S, which will be ignited by the taper kept constantly burning in close relation to the burner S. By these means, which we designate a hydro-thermostat, the proper temperature of the fluid in the tank L is maintained at all times.

We have represented a valve formed of mercury, which, by its expansion and contraction, will close or open the communication automatically actuated by the heat of the space surrounding it. The pipe T, which extends to the bottom of the float-chamber, will have a pump attached to it, for the purpose of removing water or any heavy residuum which may accumulate in said chamber.

Having thus described our invention, what we claim as new, and desire to secure by Letters Patent, is—

1. A vaporizing-conduit, G, formed of hollow corrugated folds, substantially as described.

2. A carbureting-chamber, having the passages J and partitions *e*, combined with the conduit G and the chamber E, containing a float, $D^2$, substantially as described.

3. In a carbureting apparatus, the tank L, sinks *f g*, pipes *f′ g′*, heater N, burner S, and its taper, in combination with the mercury-vessel M and pipes P P′ K K′, substantially as described.

4. In an air or gas carbureting machine, a broad horizontal corrugated vaporizing fold or conduit with intermediate spaces between the folds combined with an automatic feeding device, substantially as described.

5. The combination, with a machine for carbureting air or enriching gas, of a hydro-thermostat which automatically regulates the temperature of the fluid hydrocarbon below the boiling-point of gasoline, substantially as and for the purpose set forth.

6. The combination, with a heater, of a carbureter set in a water-tank in which is a mercury-valve, actuated by the heat of the water, the temperature of which it controls and maintains at any point below boiling.

In testimony that we claim the above we have hereunto subscribed our names in the presence of two witnesses.

ALONZO W. PORTER.
FRANCIS M. GRIMES.

Witnesses:
TH. HARRIS HODGES,
NELSON CHANDLER.